United States Patent [19]

Seipelt

[11] Patent Number: 4,999,552
[45] Date of Patent: Mar. 12, 1991

[54] TORQUE MOTOR DRIVER

[75] Inventor: Christopher Seipelt, Cincinnati, Ohio

[73] Assignee: The United States of America as represented by the Secretary of the Air Force, Washington, D.C.

[21] Appl. No.: 486,037

[22] Filed: Feb. 27, 1990

[51] Int. Cl.⁵ .............................................. H02H 7/09
[52] U.S. Cl. ...................................... 318/434; 361/30
[58] Field of Search ............... 318/430, 432, 433, 434, 318/563, 689; 361/23, 30, 31

[56] References Cited

U.S. PATENT DOCUMENTS

| | | | |
|---|---|---|---|
| 3,868,554 | 2/1975 | Konrad | 318/434 |
| 4,531,081 | 7/1985 | Liesegang | 318/632 |
| 4,532,567 | 7/1985 | Kade | 361/31 |
| 4,547,715 | 10/1985 | Li | 361/31 X |
| 4,574,226 | 3/1986 | Binder | 318/317 |
| 4,611,154 | 9/1986 | Lambropoulos et al. | 361/23 X |
| 4,725,765 | 2/1988 | Miller | 361/31 X |
| 4,818,924 | 4/1989 | Burney | 318/434 X |
| 4,873,453 | 10/1989 | Schmerda et al. | 318/434 X |
| 4,901,181 | 2/1990 | Miyanaga et al. | 361/31 X |
| 4,933,614 | 6/1990 | Kawata | 318/432 |

Primary Examiner—Bentsu Ro
Attorney, Agent, or Firm—William Stepanishen; Donald J. Singer

[57] ABSTRACT

A torque motor driver apparatus utilizing an operational amplifier driver which operates near zero milliamps output current, to drive and control a torque motor of non-zero null current, with minimum steady-state power consumption and full functional performance. An enable/disable fail safe switch is included and is positioned in series with the power source and torque motor to disable the torque motor as necessary. A pair of sensing units sense the torque motor voltage and DC resistance to provide a fault indication when either a low resistance or shorted condition or high resistance or open condition exists.

8 Claims, 2 Drawing Sheets

TORQUE MOTOR DRIVER

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a torque motor apparatus, and in particular to an improved torque motor driver apparatus.

The state of the art of torque motor drivers is well represented and alleviated to some degree by the prior art apparatus and approaches which are contained in the following U.S. patents:

U.S. Pat. No. 3,868,554 issued to Konrad on Feb. 25, 1975;

U.S. Pat. No. 4,531,081 issued to Liesegang on July 23, 1985; and

U.S. Pat. No. 4,574,226 issued to Binder on Mar. 4, 1986.

The Konrad patent describes a current limit system for a DC motor control of the switching regulator or pulse control type which factors in both the mark-space ratio of the control, and the actual current through the motor. The maximum allowable motor current is thus controlled as a function of the mark-space ratio of a thyristor coupling the motor to a source of electrical energy.

The Liesegang patent is directed to an aircraft control surface servomotor control of the pulse width modulation type with precise motor current control for providing precise torque limiting measurements.

The Binder patent discusses the method and apparatus for controlling an electric motor, in particular a motor for driving hand tools, saws, and the like, the rotational speed of which is automatically reduced in no-load idling operation and increased when working under load to pre-determined speed values corresponding to desired working speeds. A current sensor picks up the current absorbed by the electric motor and causes the speed of the electric motor to be abruptly changed when a load condition has been detected.

The early prior art approach to torque motor control is shown in FIG. 1 which illustrates a typical circuit for a torque motor driver. The circuit is a typical voltage-to-current converter in which the current range varies from 0 to 100 milliamperes. The steady-state operating current (null current) is 50 milliamperes. Several shortcomings exist with the present prior art driver configuration. First, the driver operational amplifier must operate steady state at 50 milliamperes, which causes high power dissipation in the semiconductor driver. Second, if a cable short to ground from the high or low side of the torque motor (TM) occurs, the driver will saturate. This can result in high dissipation, overstress and damage to the driver and other circuit components. While the above-cited prior art patents are instructive, it is clear that a need still remains to provide a torque motor driver apparatus which solves the shortcomings of the prior art. The present invention is intended to satisfy that need.

SUMMARY OF THE INVENTION

The present invention utilizes a steady state operational amplifier with zero output current and a feedback sensing circuit. The driver apparatus comprises a first operational amplifier, a power source, a series control current resistance, a current sensing resistance which is connected to a second feedback operational amplifier, an enable/disable fail safe switch, a torque motor short-circuit detector to monitor the torque motor voltage which detects a shorted TM or a TM whose DC resistance is lower than 4 ohms, a torque motor open-circuit detector which also monitors the torque motor voltage and detects an open TM o a TM with a DC resistance higher than 15 ohms, and a logic circuit to provide a torque motor failure indication.

It is one object of the present invention, therefore, to provide an improved torque motor driver apparatus.

It is another object of the invention to provide an improved torque motor driver apparatus wherein the operational amplifier driver operates steady-state with an output current of zero milliamperes, to minimize driver dissipation and power supply size.

It is another object of the invention to provide an improved torque motor driver apparatus wherein a cable short to ground on either side of the torque motor will not saturate the operational amplifier driver.

It is another object of the invention to provide an improved torque motor driver apparatus wherein the operational amplifier driver will maintain the desired current by the input signal in the event of a short circuit to the torque motor.

It is another object of the invention to provide an improved torque motor driver apparatus wherein an enable/disable fail safe switch circuit is utilized to protect and control the torque motor current.

It is another object of the invention to provide an improved torque motor driver apparatus wherein both a short circuit and open circuit sensor unit is utilized to disable the current to the torque motor, through the enable/disable input.

It is another object of the invention to provide an improved torque motor driver apparatus wherein a fault signal is produced for a TM DC resistance out-of-range by being less than 4 ohms, or for a TM DC resistance out-of-range by being greater than 15 ohms.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
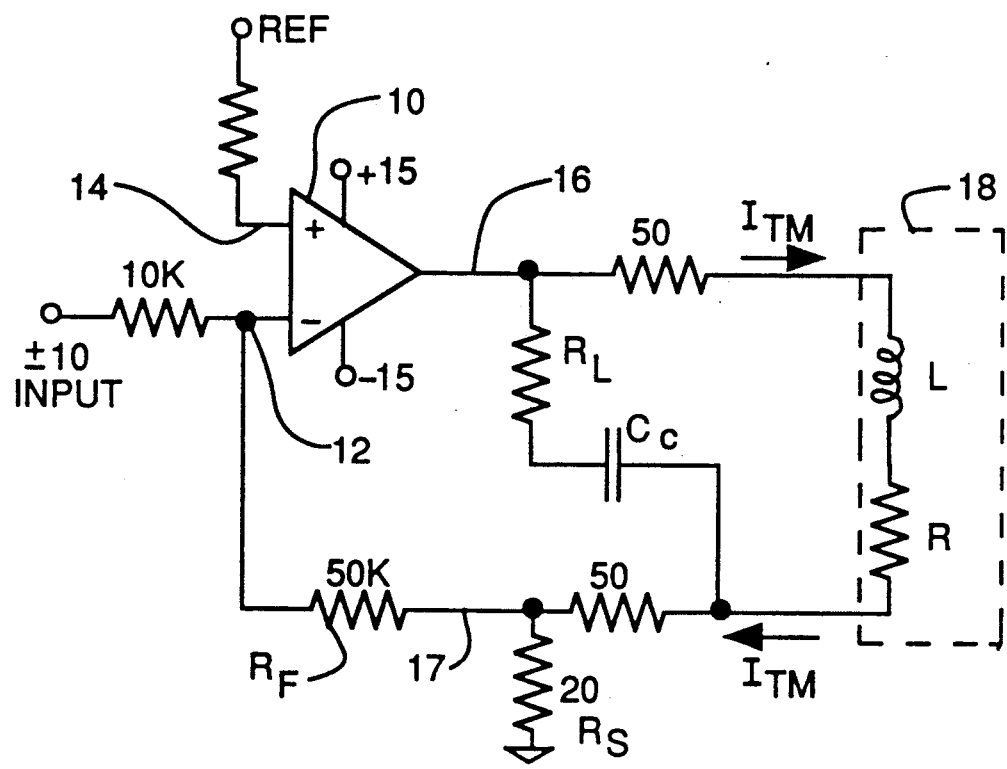
FIG. 1 is a schematic diagram of a prior art torque motor driver.

Referring now to FIG. 1, there is shown a schematic diagram of a prior art torque motor driver. The torque motor driver comprises an operational amplifier unit 10 which receives a ±10 volt input signal at its inverting input terminal 12. A reference voltage which is proportional to the demanded output current is applied to the non-inverting terminal 14. The output signal from the operational amplifier is applied to the torque motor 18 which is shown schematically as an inductor L in series with a resistor R. A voltage feedback signal is applied to the inverting input terminal 12 by means of resistor $R_F$.

The voltage feedback signal is proportional to the torque motor current at terminal 17, where the feedback voltage is equal to $I_{TM} \times R$. As previously stated, the prior art torque motor driver is a typical voltage to current converter which operates with a current range of approximately 0 to 100 milliamperes.

Figure 2:
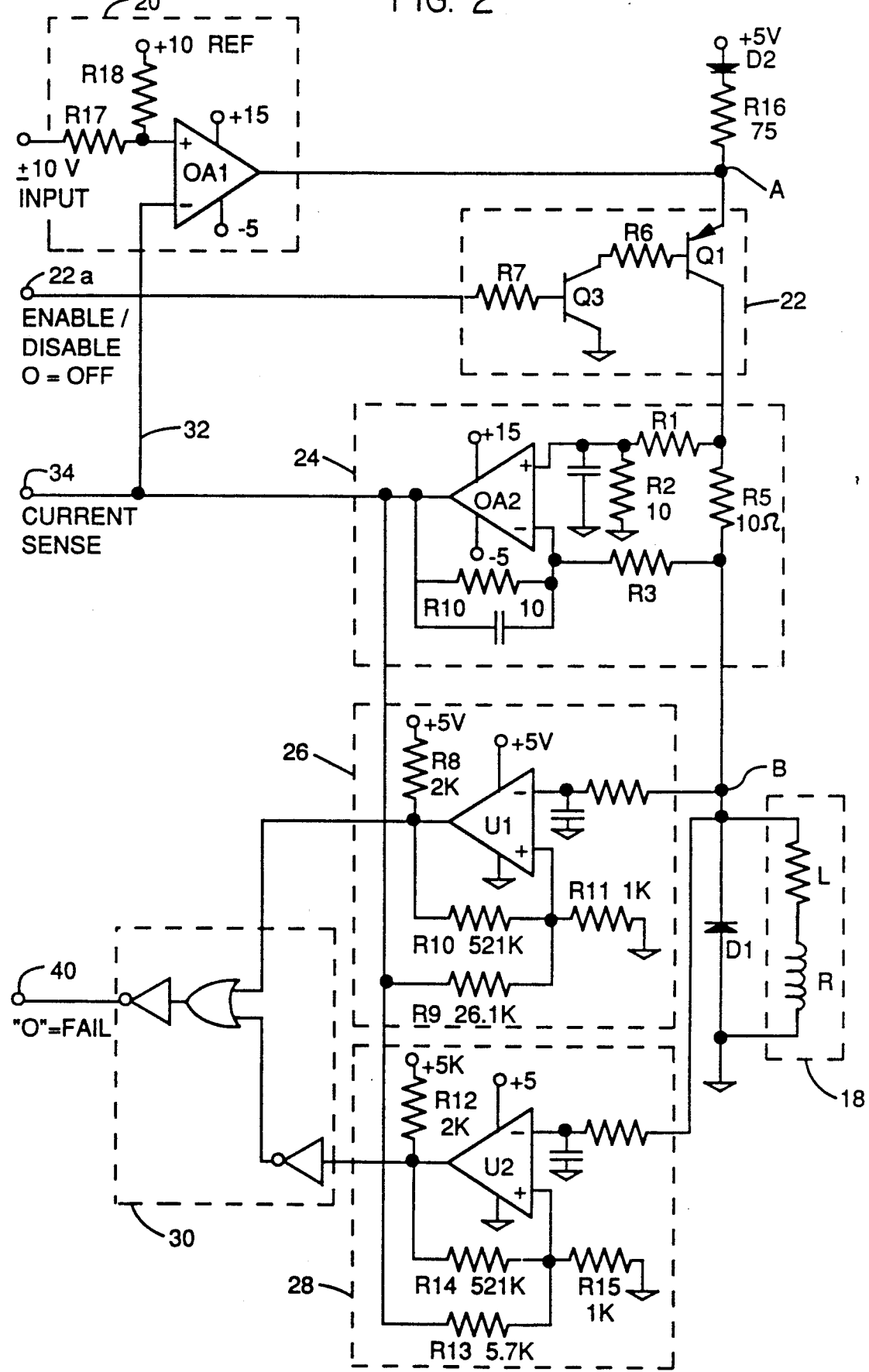
FIG. 2 is a schematic diagram of the improved torque motor driver apparatus according to the present invention.

Turning now to FIG. 2, there is shown a schematic diagram of an improved torque motor driver apparatus utilizing a driver unit 20 which comprises an operational amplifier OA1. The output signal from the driver unit controls the voltage at point A and thereby the voltage drop across resistor R16 which in turn affects the current to the torque motor 18. A +5 volt power source is connected to point A by current control resistor R16 and unidirectional diode D2. Torque motor drive current is applied through a enable/disable fail safe switch unit 22 and a current sense resistor R5 to the torque motor 18. The enable/disable fail safe switch unit 22 comprises transistors Q3 and Q1 which is connected in series between the +5 volts power source current control resistor R16 and the sense resistor R5. An enable/disable control signal is applied to terminal 22a to either provide or prevent current from reaching the torque motor 18. A current feedback unit 24 which operates in conjunction with current sensing resistor R5 provides a voltage feedback loop 32 to the inverting (−) terminal of operational amplifier OA1. The current feedback unit 24 comprises an operational amplifier OA2.

The voltage which is across the torque motor is sensed by a pair of torque motor voltage sensing units 26, 28. Both torque motor voltage sensing units 26, 28 utilize an operational amplifier unit, respectively labeled U1, U2. The current sense signal which is the output of operational amplifier OA2 of the current feedback unit 24 is applied to the non-inverting terminal, respectively, of voltage comparator units U1, U2, to form a torque motor resistance measuring circuit. The inverting terminal of voltage comparator units U1, U2 are respectively connected to point B which is the high side of the torque motor 18. The voltage at point B is sensed by both torque motor voltage sensing units 26, 28. When torque motor voltage sensing unit 26 detects a short circuit at point B or a DC torque motor resistance less than 4 ohms, it provides a fault signal to the logic unit 30. When torque motor voltage sensing unit 28 detects an open circuit at point B or torque motor resistance greater than 15 ohms, it provides a fault signal to the logic unit 30. When the logic unit 30 receives a fault signal from either torque motor fault sensing unit 26 or 28, the logic unit 30 outputs at terminal 40 a digital zero which represents a torque motor load out of range failure.

The improved torque motor driver apparatus which is illustrated in FIG. 2 operates in the following manner and provides new features and advantages. The torque motor driver unit 20 sources or sinks current from the +5 V power source through current control resistor R16 to provide a controlled current to the torque motor 18. The controlled current passes through the current sense resistor, R5 which is in series with the torque motor 18. Feedback unit 24 closes the feedback loop to the driver unit 20 by sensing the voltage across current sense resistor R5, which is 10 times the current, and returns a voltage signal to the inverting terminal of operational amplifier which is equal to the voltage at the non-inverting terminal. The output of operational amplifier OA2 also provides a current monitor sense output at terminal 34, built in for test purposes.

There are three main advantages to the new driver technique. First, the driver operational amplifier OA1 operates at a steady-state with an output current of zero milliamperes. This minimizes steady-state dissipation in the semiconductor part and transfers it to a resistor which dissipates power reliably even at elevated temperatures. Second, the total quiescent power supply requirements are reduced by nearly two-thirds. Third, if a cable short to ground from the high or low side of the torque motor occurs, the driver will not saturate and will maintain the current desired by the input signal. Several new features have been added to the circuit as needed for the program. Bipolar transistors Q1 and Q3 provide an enable/disable fail safe switch to disable torque motor current as necessary. Torque motor voltage sensing unit 26 senses the torque motor voltage to detect a shorted torque motor or a torque motor whose DC resistance is lower than 4 ohms.

Torque motor voltage sensing unit 28 also senses the torque motor voltage and detects an open torque motor or a torque motor whose DC resistance is higher than 15 ohms. The outputs of torque motor voltage sensing unit 26 and torque motor voltage sensing unit 28 are applied to logic unit 30 which provides a signal to indicate a fault condition. Resistor R18 could be eliminated if only a 0 to +10 V input signal is used. Bipolar transistors Q1 and Q3 could be replaced by a MOSFET if a radiation hardened part becomes available, to provide positive and negative output torque motor currents. The circuit may be built from discrete parts or may be made as a custom large scale integration part.

Although the invention has been described with reference to a particular embodiment, it will be understood by those skilled in the art that the invention is capable of a variety of alternative embodiments within the spirit and scope of the appended claims.

What is claimed is:

1. A torque motor driver apparatus comprising in combination further a driver means having a first input, a second input and an output, said first input receiving a digital voltage signal, said driver means having an output current of zero milliamperes for a 50 milliampere null torque motor current, a power source of a predetermined level, said power source operatively connected to said output of said driver means, said power source providing a current output signal, said driver means controlling said current output signal from said power source, a feedback means operatively connected to said power source to receive said current output signal therefrom, said feedback means sensing said current output signal and providing a current sense signal in response thereto, said current sense signal being applied to said second input of said driver means, a torque motor operatively connected to said feedback means to receive said current output signal therefrom, said torque motor operating at a predetermined torque in response to said current output signal, and, a first voltage sensing means and a second voltage sensing means, said torque motor being connected between said feedback means and ground, the junction between said torque motor and said feedback means comprising the high side of said torque motor, said first and second voltage sensing means being connected to said high side of said torque motor to sense the voltage across said torque motor, said first voltage sensing means providing a first output signal when said torque motor voltage indicates a shorted torque motor or a torque motor with a D.C. resistance less than a first predetermined value, said second voltage sensing means providing a second output signal when said torque motor voltage indicates an open torque motor or a torque motor with a D.C. resistance greater than a second predetermined value.

2. A torque motor driver apparatus as described in claim 1 wherein said driver means comprises an operation amplifier in which said first input comprises a non-inverting input terminal and said second input comprises an inverting input terminal.

3. A torque motor driver apparatus as described in claim 1 wherein said power source comprises a voltage source in series with a resistor, said resistor determining the maximum current which is supplied by said power source.

4. A torque motor driver apparatus as described in claim 1 wherein said first and second output signals from said first and second voltage sensing means are respectively applied to a logic unit, said logic unit provide a torque motor failed signal when either said first or second output signal is received.

5. A torque motor driver apparatus as described in claim 1 wherein said first predetermined value represents a value of four ohms or less.

6. A torque motor driver apparatus as described in claim 1 wherein said second predetermined value represents a value of fifteen ohms or greater.

7. A torque motor driver apparatus as described in claim 1 further including an enable/disable fail safe switch, said enable/disable fail safe switch operatively connected between said power source and said feedback means, said enable/disable fail safe switch, when activated, will prevent said current output signal from operating said torque motor.

8. A torque motor driver apparatus as described in claim 7 wherein said feedback means comprises an operational amplifier which is connected across a current sensing resistor to sense said torque motor current, said current sensing resistor being connected in series with said fail safe switch and said torque motor.

* * * * *